US010203704B2

(12) United States Patent
Weber

(10) Patent No.: US 10,203,704 B2
(45) Date of Patent: Feb. 12, 2019

(54) FLUID METERING VALVE

(71) Applicant: Moog Inc, East Aurora, NY (US)

(72) Inventor: Gregory B. Weber, Carson City, NV (US)

(73) Assignee: Moog Inc., East Aurora, NY (US)

(*) Notice: Subject to any disclaimer, the term of this patent is extended or adjusted under 35 U.S.C. 154(b) by 57 days.

(21) Appl. No.: 15/625,977

(22) Filed: Jun. 16, 2017

(65) Prior Publication Data
US 2017/0364097 A1 Dec. 21, 2017

Related U.S. Application Data

(60) Provisional application No. 62/351,252, filed on Jun. 16, 2016.

(51) Int. Cl.
G05D 7/06 (2006.01)
F16K 11/07 (2006.01)
(Continued)

(52) U.S. Cl.
CPC ......... G05D 7/0623 (2013.01); F15B 13/043 (2013.01); F15B 21/087 (2013.01);
(Continued)

(58) Field of Classification Search
CPC .. F15B 13/043; F15B 13/0438; F15B 13/086; F15B 19/002; F15B 19/005;
(Continued)

(56) References Cited

U.S. PATENT DOCUMENTS 3,899,001 A 8/1975 Orme
3,917,221 A 11/1975 Kubota et al.
(Continued)

FOREIGN PATENT DOCUMENTS

DE 102014213209 A1 12/2015
WO 2006005290 A1 1/2006

OTHER PUBLICATIONS

The International Search Report (ISR) and Written Opinion of the International Searching Authority for International Application No. PCT/US2017/038026; Publication No. WO 2017/218991 A1; dated Sep. 15, 2017.
(Continued)

Primary Examiner — William McCalister
(74) Attorney, Agent, or Firm — Harter Secrest & Emery LLP

(57) ABSTRACT

A servovalve system comprising a pilot stage valve in communication with an hydraulic stage valve, the hydraulic stage valve comprising a valve member movably mounted in a valve chamber to selectively meter fluid flow in a flow path from an upstream inlet port to a downstream outlet port and at least two variable-sized orifices disposed in the flow path between the inlet and outlet ports, an upstream pressure sensor, a downstream pressure sensor, a fluid temperature sensor, a position sensor sensing a linear position of the valve member, a controller that receives input from the upstream pressure sensor, the downstream pressure sensor, the fluid temperature sensor and the position sensor; and the controller configured to provide a control signal to the pilot stage valve as a function of the input from the upstream pressure sensor, the downstream pressure sensor, the fluid temperature sensor and the position sensor.

15 Claims, 11 Drawing Sheets

(51) Int. Cl.
| | | |
|---|---|---|
| *F16K 31/00* | (2006.01) | |
| *F16K 31/02* | (2006.01) | |
| *F16K 37/00* | (2006.01) | |
| *F15B 13/043* | (2006.01) | |
| *F15B 21/08* | (2006.01) | |
| *G05D 3/12* | (2006.01) | |
| *F15B 13/08* | (2006.01) | |
| *F15B 19/00* | (2006.01) | |
| *F15B 13/04* | (2006.01) | |

(52) U.S. Cl.
CPC ............ *F16K 11/07* (2013.01); *F16K 31/002* (2013.01); *F16K 31/02* (2013.01); *F16K 37/005* (2013.01); *F16K 37/0041* (2013.01); *G05D 3/12* (2013.01); *F15B 13/0438* (2013.01); *F15B 13/086* (2013.01); *F15B 19/002* (2013.01); *F15B 19/005* (2013.01); *F15B 2013/0409* (2013.01); *F15B 2211/615* (2013.01); *F15B 2211/634* (2013.01); *F15B 2211/6306* (2013.01); *F15B 2211/6309* (2013.01); *F15B 2211/6316* (2013.01); *F15B 2211/6343* (2013.01); *F15B 2211/6654* (2013.01); *F15B 2211/6656* (2013.01); *F15B 2211/8609* (2013.01)

(58) Field of Classification Search
CPC ............ F15B 2013/0409; F15B 21/087; F15B 2211/615; F15B 2211/6306; F15B 2211/6309; F15B 2211/6316; F15B 2211/634; F15B 2211/6343; F15B 2211/6654; F15B 2211/6656; F15B 2211/8609; F16K 11/07; F16K 31/002; F16K 31/02; F16K 31/0041; F16K 31/005; G05D 3/12; G05D 7/0623
USPC .............................................. 137/485–492.5
See application file for complete search history.

(56) References Cited

U.S. PATENT DOCUMENTS

| | | | | |
|---|---|---|---|---|
| 4,056,125 A | | 11/1977 | McNabb | |
| 5,388,607 A | * | 2/1995 | Ramaker | F23N 1/005 137/487 |
| 5,549,137 A | * | 8/1996 | Lenz | G05D 7/005 137/486 |
| 5,758,499 A | * | 6/1998 | Sugiyama | F04B 49/065 60/450 |
| 5,806,565 A | | 9/1998 | Kadlicko | |
| 8,763,639 B2 | * | 7/2014 | Cook | F16F 9/466 137/625.37 |
| 2004/0011052 A1 | * | 1/2004 | Clements | F02C 9/263 60/773 |
| 2004/0025492 A1 | * | 2/2004 | Griffiths | F02C 7/228 60/39.281 |
| 2005/0072954 A1 | | 4/2005 | Nielsen | |
| 2005/0217255 A1 | * | 10/2005 | Aratsuka | F01N 3/0235 60/295 |
| 2007/0095059 A1 | * | 5/2007 | VerKuilen | E02F 9/2235 60/468 |
| 2009/0306830 A1 | | 12/2009 | Cummings et al. | |
| 2010/0170227 A1 | * | 7/2010 | Tsukada | E02F 9/00 60/286 |
| 2013/0052105 A1 | * | 2/2013 | Butler | C02F 9/00 423/140 |
| 2014/0290237 A1 | * | 10/2014 | Yoshida | F02D 41/029 60/452 |
| 2014/0350800 A1 | * | 11/2014 | Yoshida | F02D 29/02 701/50 |
| 2015/0096758 A1 | * | 4/2015 | Babbitt | E21B 33/064 166/335 |
| 2015/0149047 A1 | * | 5/2015 | Kubota | E02F 9/2054 701/50 |

OTHER PUBLICATIONS

Continental Controls Corporation Product Certification Gas Fuel Metering Valve AGV10: Metering Gas Fuel to GAs Turmines ISO 9001 Certified (4 pages).

Woodward: TecJet™ 50 Plus Precision Flow Intelligent Electronic Gas Metering Valve Copyright © Woodward 2005 (Revision A, Apr. 2005) 4 pages.

Flowserve: Cavitation Control © 2006 Flowserve Corporation (20 pages).

\* cited by examiner

FLUID METERING VALVE

TECHNICAL FIELD

The present invention relates generally to the field of flow control valves and, more particularly, to an improved fluid metering valve system.

BACKGROUND ART

Fluid control valves are known. These may be thought of as having either a single stage or as having multiple stages. In both forms, a valve spool is slidably mounted within a cylinder for controlled movement there along. When the valve spool is in a null position within the cylinder, various lands on the valve spool cover ports that communicate with the control outlets to prevent flow through the valve. The direction and magnitude of spool movement off-null controls the flows through the valve.

A single-stage or direct-drive valve generally has a motor or some other mechanism that directly engages the valve spool, and which selectively causes the spool to move off-null. A multiple-stage valve may have a pilot stage that controls movement of a valve spool in a second stage. The pilot stage may be a nozzle-flapper, jet-pipe or deflector-jet valve.

BRIEF SUMMARY

With parenthetical reference to the corresponding parts, portions or surfaces of the disclosed embodiment, merely for purposes of illustration and not by way of limitation, an improved flow control valve system (15) is provided comprising: a pilot stage valve element (16); an hydraulic stage valve element (18) in fluid communication with the pilot stage valve element; the hydraulic stage valve element comprising a valve member (19) movably mounted in a valve chamber (20) along a valve axis (x-x), and adapted to be moved along the valve axis to selectively meter fluid flow in a flow path from at least one upstream inlet port (21) defined between the valve member and the valve chamber and at least one downstream outlet port (22) defined between the valve member and the valve chamber; the hydraulic stage valve element comprising at least two variable-sized orifices (24, 25) defined between the valve member and the valve chamber and disposed in the flow path between the upstream inlet port and the downstream outlet port; an upstream pressure sensor (26); a downstream pressure sensor (28); a fluid temperature sensor (29); a position sensor (30) configured to sense a linear position of the valve member relative to the valve chamber; a controller (31) configured to receive input from the upstream pressure sensor, the downstream pressure sensor, the fluid temperature sensor and the position sensor; and the controller configured to provide a control signal to the pilot stage valve element as a function of the input from the upstream pressure sensor, the downstream pressure sensor, the fluid temperature sensor and the position sensor.

DESCRIPTION OF THE EMBODIMENTS

Figure 1:
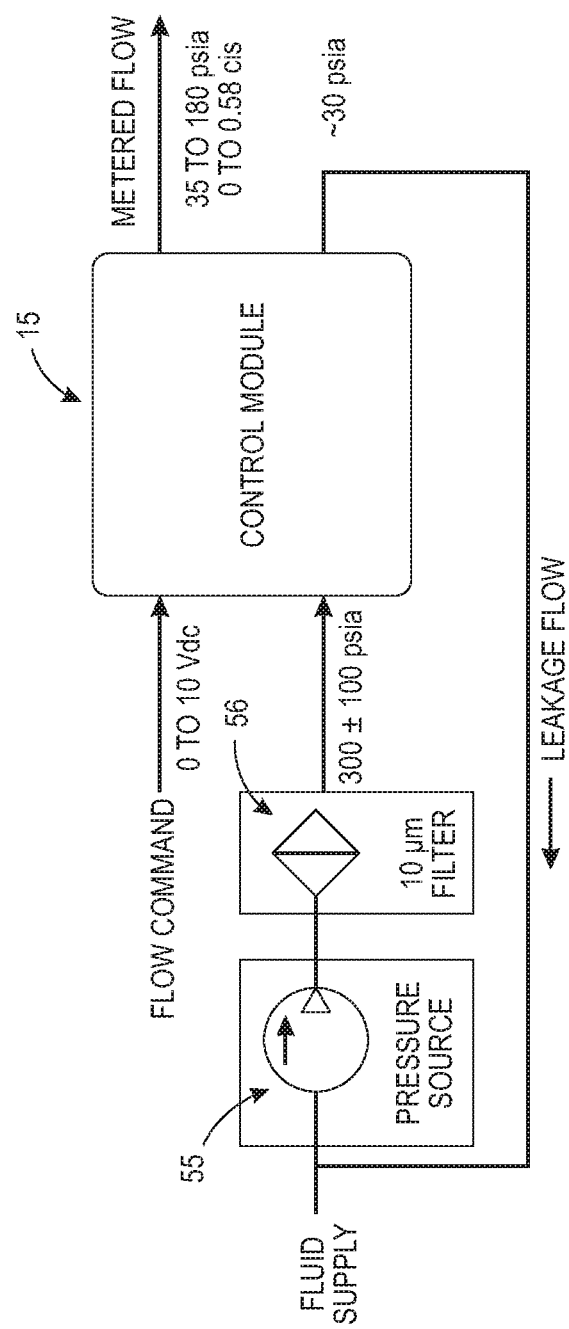
FIG. 1 is a general system view of an embodiment of an improved flow control valve system.
Figure 2:
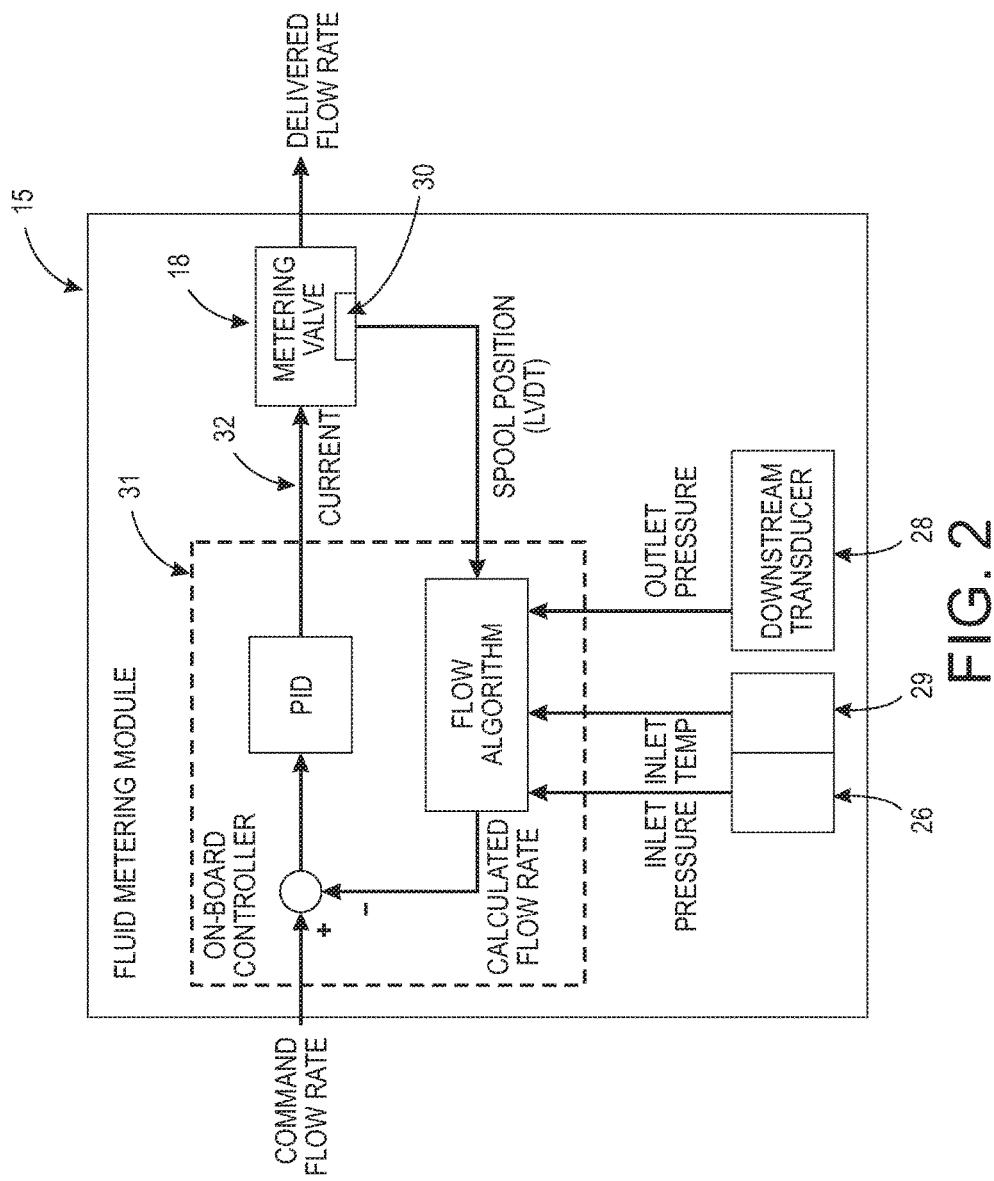
FIG. 2 is a block diagram of the flow control valve system shown in FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, an improved two-stage hydraulic metering valve is provided, an embodiment 15 of which is generally shown. System 15 broadly includes pilot stage assembly 16 having drain 53 and in fluid communication with metering valve 18 so as to drive spool 19 of metering valve 18 linearly along axis x-x relative to chamber 20, shutoff valve assembly 40, internal filter 33, fluid temperature sensor 29, upstream pressure sensor 26, downstream pressure sensor 28, and control electronics 38, all contained in housing 35 having cover 36 and flow control valve inlet 57 and flow control valve outlet 58.

As shown in FIG. 1, in this embodiment valve module 15 is configured to receive an analog voltage flow or input command and to output metered flow at a desired volumetric flow rate. In this embodiment, module 15 provides a dynamic response having a rise time of no greater than one second. As shown, fluid supply is provided via pressure source 55 and filter 56.

Figure 9:
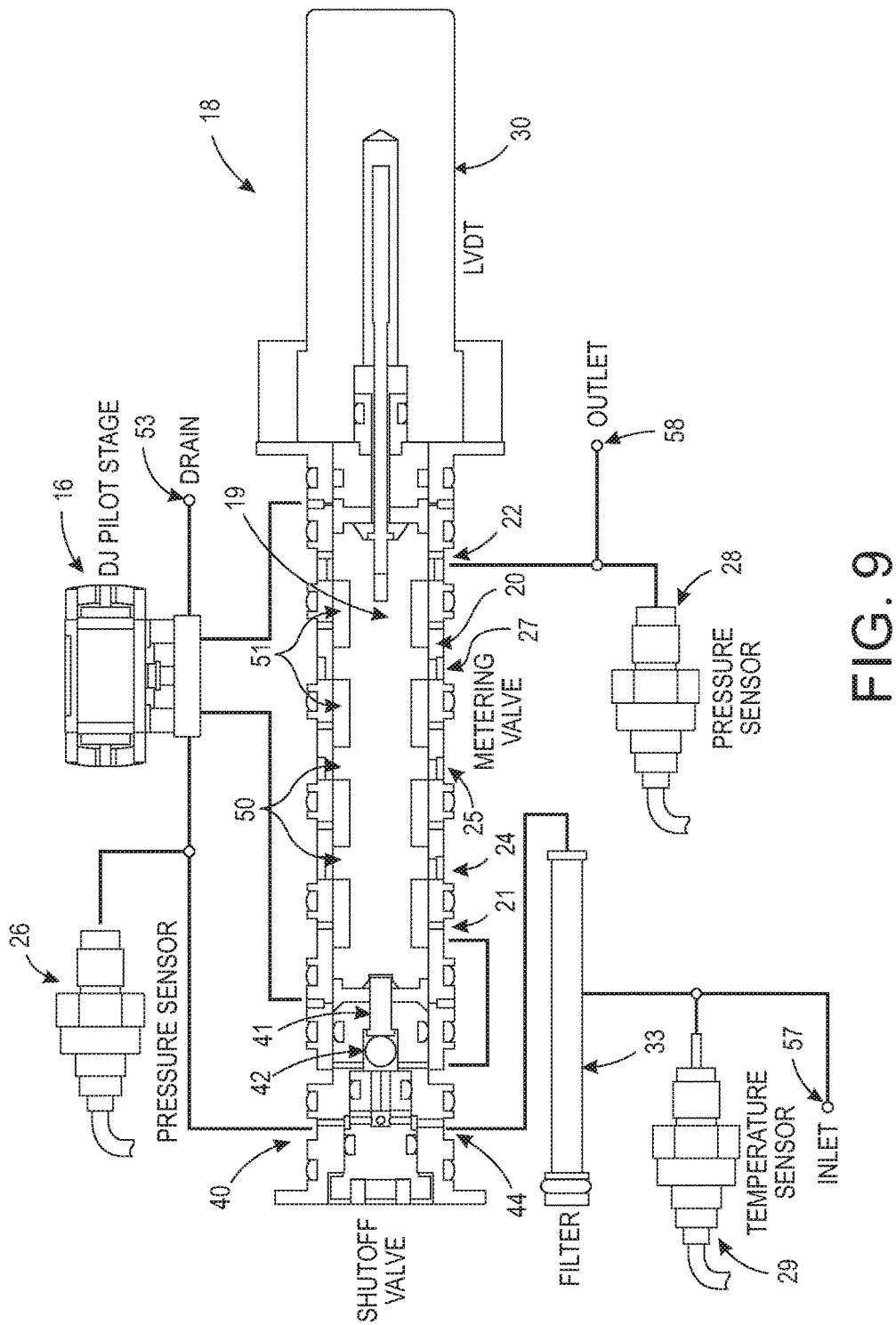
FIG. 9 is a partial schematic and partial sectional view of the hydraulic configuration of the flow control valve system shown in FIG. 8.

In this embodiment, the pilot stage is a conventional deflector-jet type valve 16 suitable for generating a pressure difference that can be used for moving spool 19 of metering assembly 18. A deflector movably responsive to a control signal is arranged in a servovalve to deflect a free jet stream of fluid discharged from a fixed nozzle with respect to a pair of fixed receiver passages. Such deflection produces a differential fluid output in the fixed receiver passages which is responsive to the control signal. As shown in FIG. 9, the output flow of the pilot stage valve connects to the respective end chambers of metering valve 18, with spool 19 adapted to be selectively and controllably shifted by differential pressure between such end chambers either leftwardly or rightwardly, as desired, within cylinder 20 along axis x-x. Thus, the pilot stage shown in the drawings operates on the deflector jet principle. However, alternatively the pilot stage could be configured as a nozzle-flapper, a jet pipe, a solenoid, a staged electro-hydraulic servovalve or a direct drive device.

Figure 10:
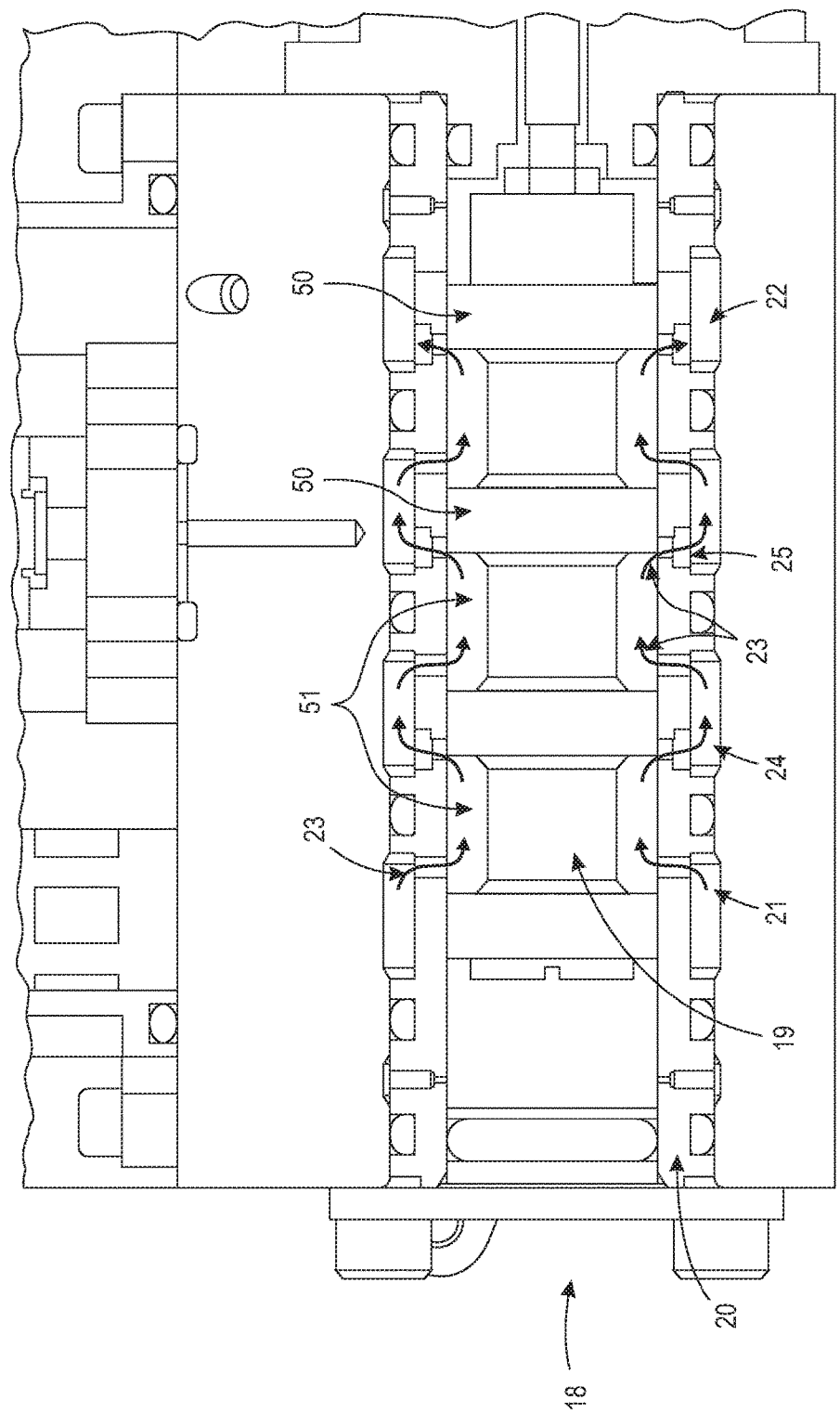
FIG. 10 is an enlarged view of an embodiment of the main valve shown in FIG. 9 showing a series of variable-sized orifices defined between the valve spool and the valve chamber and the metering flow path.

As shown, metering valve assembly 18 includes cylindrical valve chamber 20 and valve spool 19 therein. Valve spool 19 comprises a plurality of lands 50 and grooves 51 along its longitudinal extent, and is adapted to be selectively and controllably shifted by pilot stage 16 within valve cylinder 20 along valve axis x-x as shown. Spool 19 is moved linearly in valve chamber 20 to meter flow 23 as shown in FIG. 10. With two or more orifices 24, 25, 27 in series, the slot widths are tailored to keep the pressure ratio across the first orifice below the cavitation threshold. The spool 19 position modulates along the length of the slots. As shown, in this embodiment metering valve 18 includes at least three pressure drops arranged in series between metering valve inlet port 21 and outlet port 22. Each set of metering slots 24, 25, 27, 22 is sized to ensure its upstream and downstream pressure ratio does not exceed a threshold, such as for example 2.0, so as to avoid any impairment of steady state accuracy which might otherwise result from cavitation effects. Specifically, flow curve hysteresis associated with the onset and cessation of cavitation resulting from changes in outlet pressure is addressed by the design. Thus, potential discontinuities associated with cavitation effects are avoided through the use of multiple metering slots 24, 25, 27 arranged in series, in order to keep metering edge pressure ratios below a critical value, for example 2.0.

Figure 12:
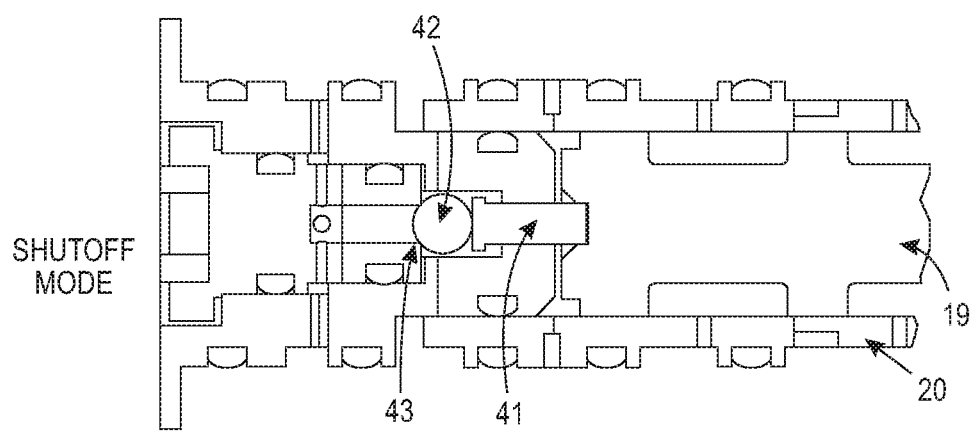
FIG. 12 is a cross-sectional view of the main valve shown in FIG. 11 in a shutoff mode.
Figure 13:
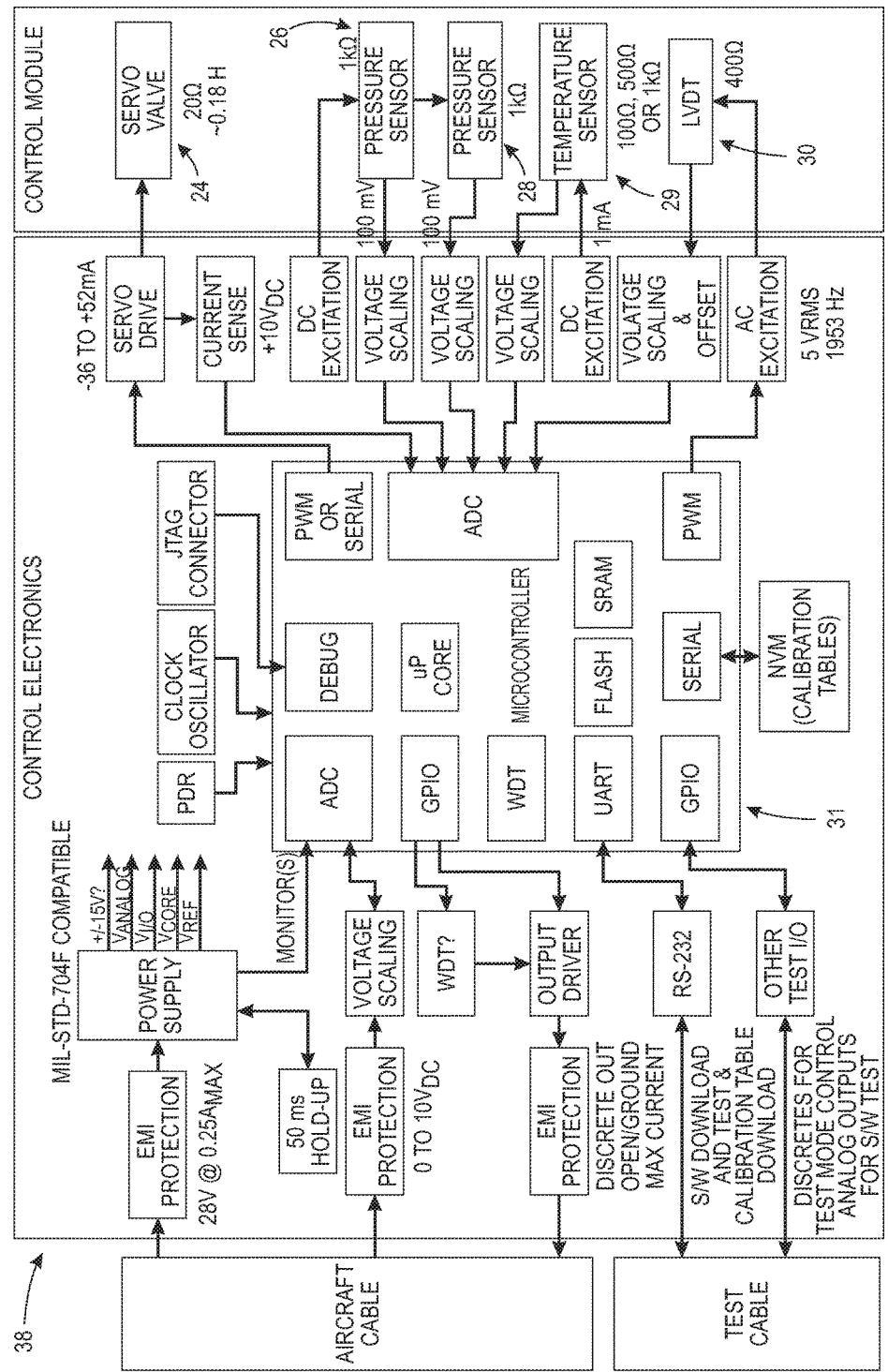
FIG. 13 is a detailed block diagram of an embodiment of the control electronics of the flow control valve system shown in FIG. 1.

As shown in FIG. 12, rather than relying solely on spool overlap, shutoff valve components 40 are provided between shutoff inlet port 44 and metering valve inlet port 21. Shutoff is achieved by driving spool 19 against plunger 41, which in turn loads ball 42 against Vespel seat 43. A bias spring could be added to the spool, causing the valve to default to shutoff mode upon removal of supply pressure.

As shown, filter 33 is provided in the supply lines to trap and contain any particles of contamination and prevent jamming. In this embodiment, the operating fluid is Halocarbon 1.8 CTEFE oil, which is a non-flammable, non-reactive, high density, and low viscosity fluid.

Operating modes include Shutoff, Metering, SBIT and CBIT. Shutoff mode corresponds to a flow rate command signal of about 0 volts. In Shutoff mode, with 0 to 1 VDC commanded, flow 23 is zero, with no leakage. As described above, this is achieved by driving spool 19 against plunger 41, which in turn loads ball 42 against Vespel seat 43.

Figure 11:
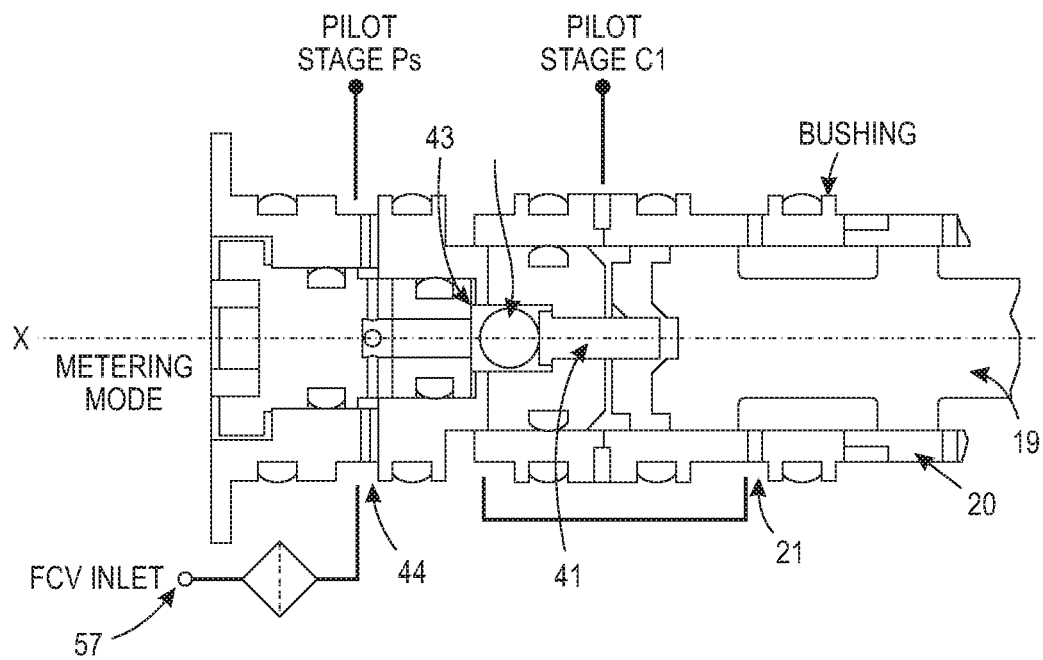
FIG. 11 is a partial cross-sectional view of the main valve shown in FIG. 9 in a metering mode.

As shown in FIG. 11, in Metering mode, corresponding to a flow rate command signal of between about 1 and 10 VDC, control port 58 flow rate is proportional to the command signal, within a tolerance band of ±0.019 cis. The valve's on-board controller 31 modulates spool 19 position in a closed loop fashion in order to minimize the difference between the commanded flow rate and a calculated flow rate.

Figure 3:
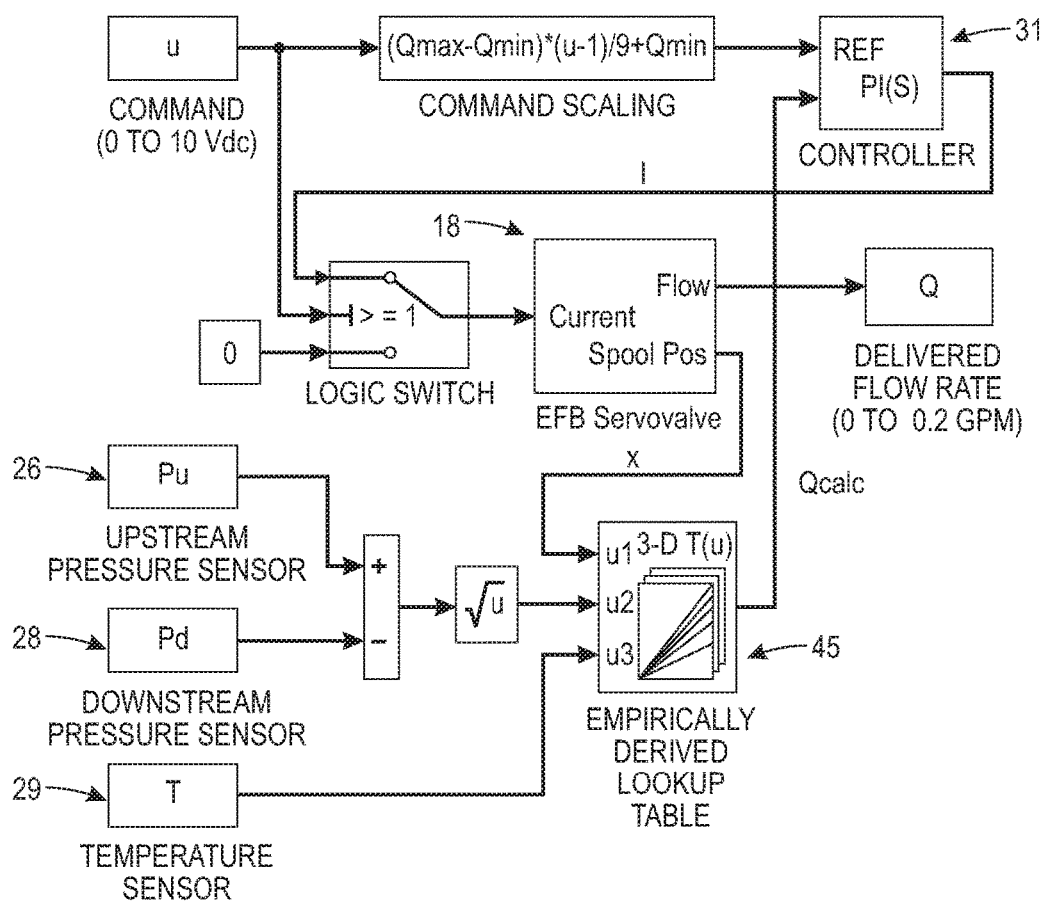
FIG. 3 is a system diagram of the flow control valve system shown in FIG. 1.

As shown in FIG. 3, electronics 38 close the loop on the calculated flow rate. The flow rate calculation relies on three-dimensional lookup table 45, whose values get loaded as part of the valve calibration process. In this way, each assembly's unique combination of nonlinearities and offsets can be compensated for, including effects associated with metering slot shapes, metering edge irregularities, sensor characteristics and analog electronics (except for noise and drift).

Figure 4:
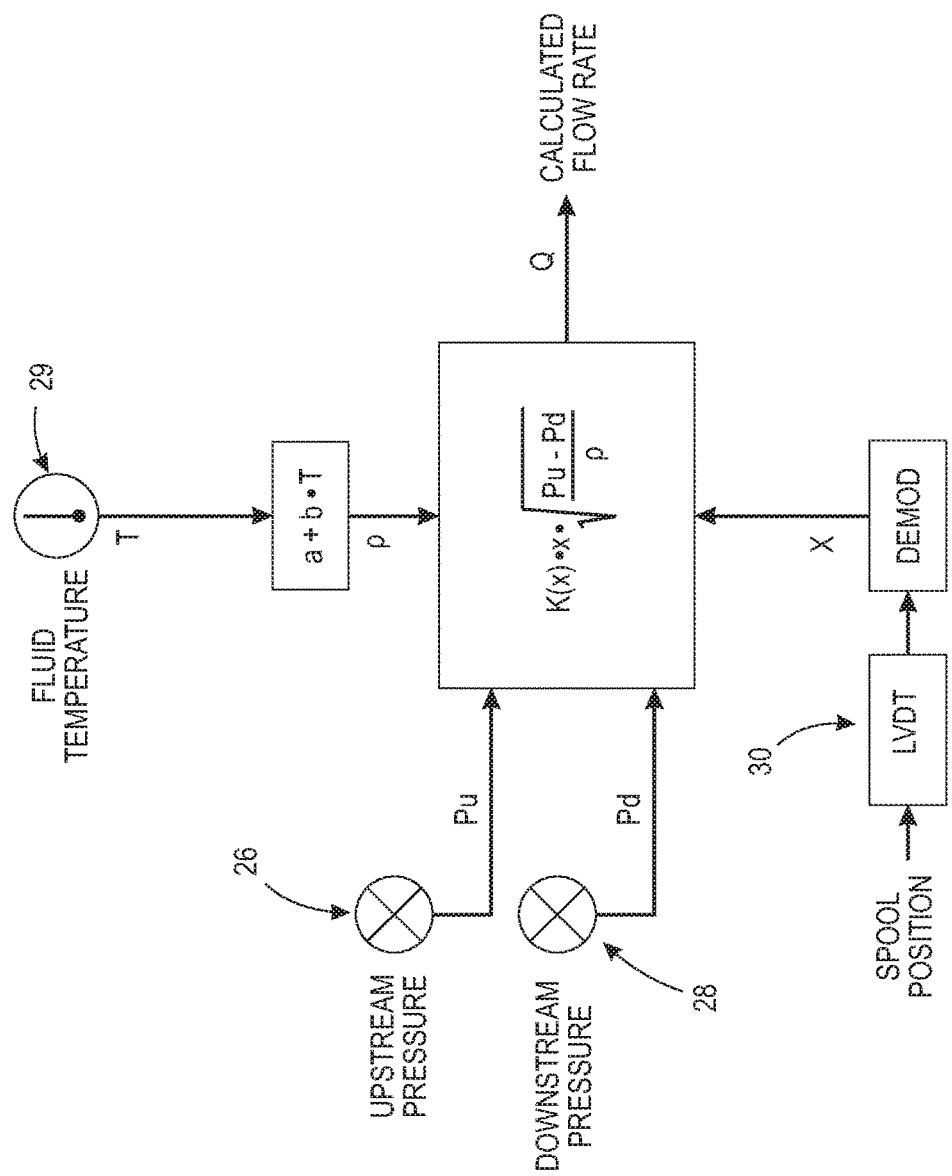
FIG. 4 is a block diagram of the calculated flow rate.
Figure 5:
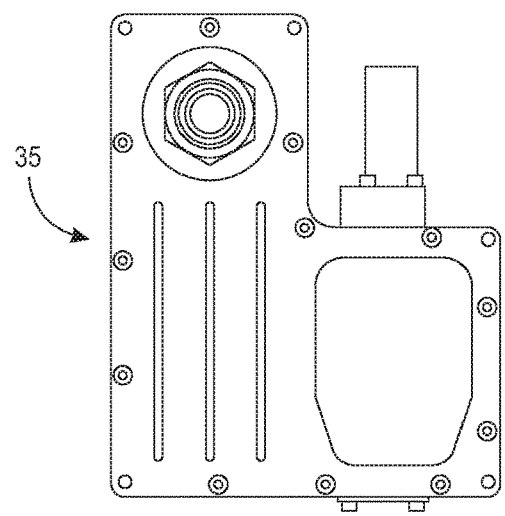
FIG. 5 is a top plan view of the flow control valve system shown in FIG. 1.
Figure 6:
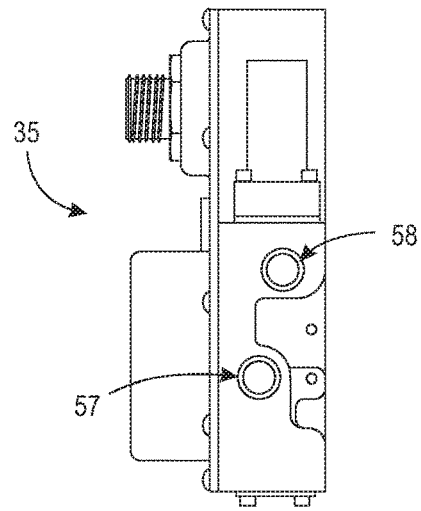
FIG. 6 is a right side view of the flow control valve system shown in FIG. 4.
Figure 7:
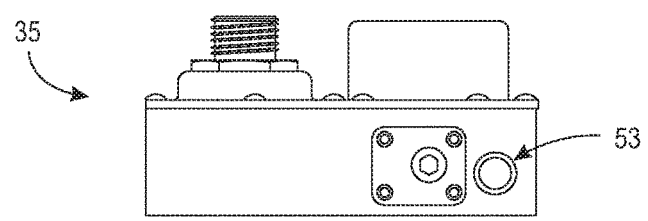
FIG. 7 is a front side view of the flow control valve system shown in FIG. 4.
Figure 8:
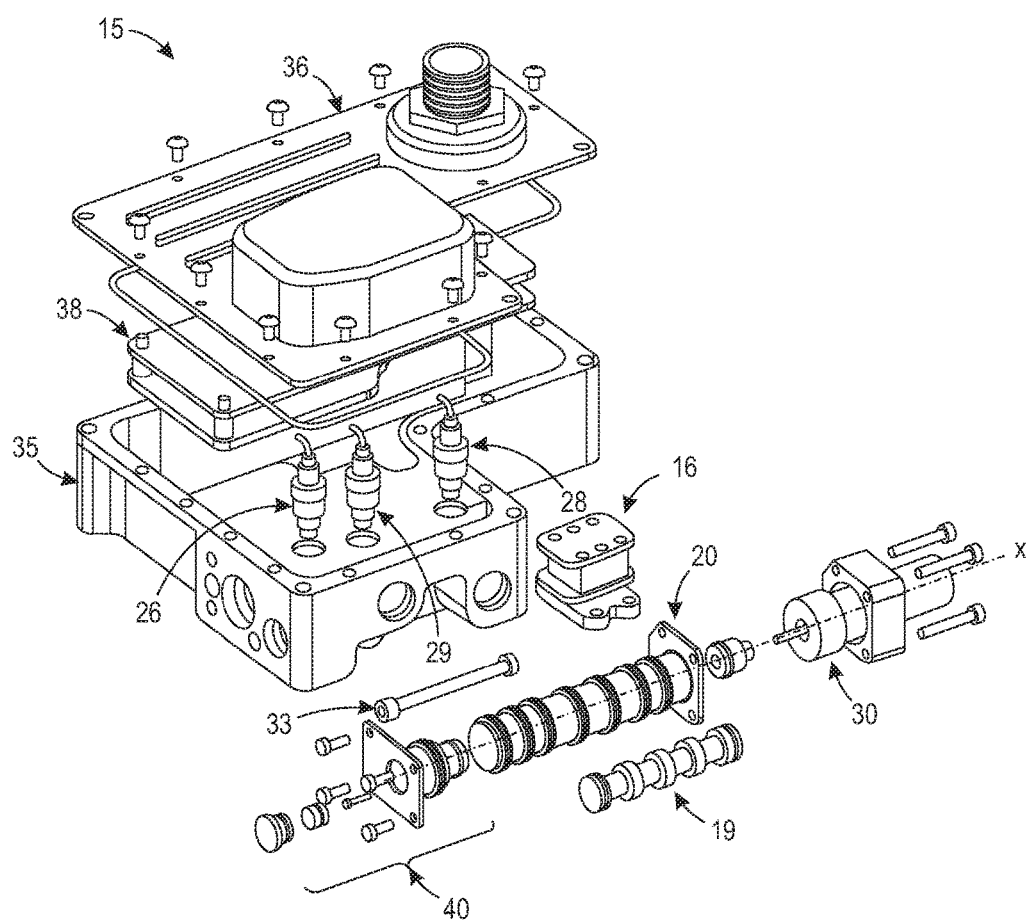
FIG. 8 is an exploded view of the flow control valve system shown in FIG. 4.

As shown in FIG. 4, calculated flow rate is derived from sensors 30, 29, 26 and 28 measuring spool 19 position, fluid temperature and pressure drop, respectively. The calculated flow rate is used as the basis for loop closure. In this embodiment, the calculation of flow rate is based on the implementation of the classic orifice equation shown in FIG. 4. $K(x)$ is a function derived by curve fitting test data taken during unit calibration. The function coefficients are uniquely determined for each unit 15, and subsequently programmed into such units associated controller 31. The function compensates for any fixed offsets and nonlinearities produced by sensors 26, 28, 29 and 30. It also compensates for variations in discharge coefficients caused by geometric imperfections within the bushing spool assembly as well as slot width variations associated with normal manufacturing tolerances.

In SBIT, during startup, valve 15 is able to verify its ability to slew spool 19 from stop-to-stop within one second, using internally generated position commands. Upon completion of SBIT, valve 15 reports pass/fail results via an error I/O bit.

In CBIT, during operation, valve 15 continuously monitors itself for fatal errors, and reports same via an error I/O bit. The following items are monitored: temperature, pressures, position, LVDT sum voltage, loop error signal, and power consumption.

Position sensor 30 monitors spool 19 position for loop closure. In this embodiment, position sensor 30 is a linear variable differential transformer (LVDT). However, any sensor capable of detecting spool position in a frictionless manner, and electrically communicating that position to the controller, could be used as an alternative. For example, a Hall Effect Device (HED), inductive sensor, capacitive sensor or an encoder may be used as alternatives.

The pressure sensors include pressure transducer 26 that provides upstream pressure readings, in this embodiment near shutoff valve 40 inlet port 44, and pressure transducer 28 that provides pressure readings, in this embodiment near valve outlet 58. Temperature sensor 29 is a temperature transducer or thermocouple that provides fluid temperature readings. In this embodiment, temperature sensor 29 is upstream of shutoff valve 40 inlet port 44. The outputs from these transducers and position sensor 30 are received by controller 31. Controller 31 provides a command signal 32 as a function of the sensor readings from position sensor 30, pressure sensors 26 and 28 and temperature sensor 29.

Figure 14:
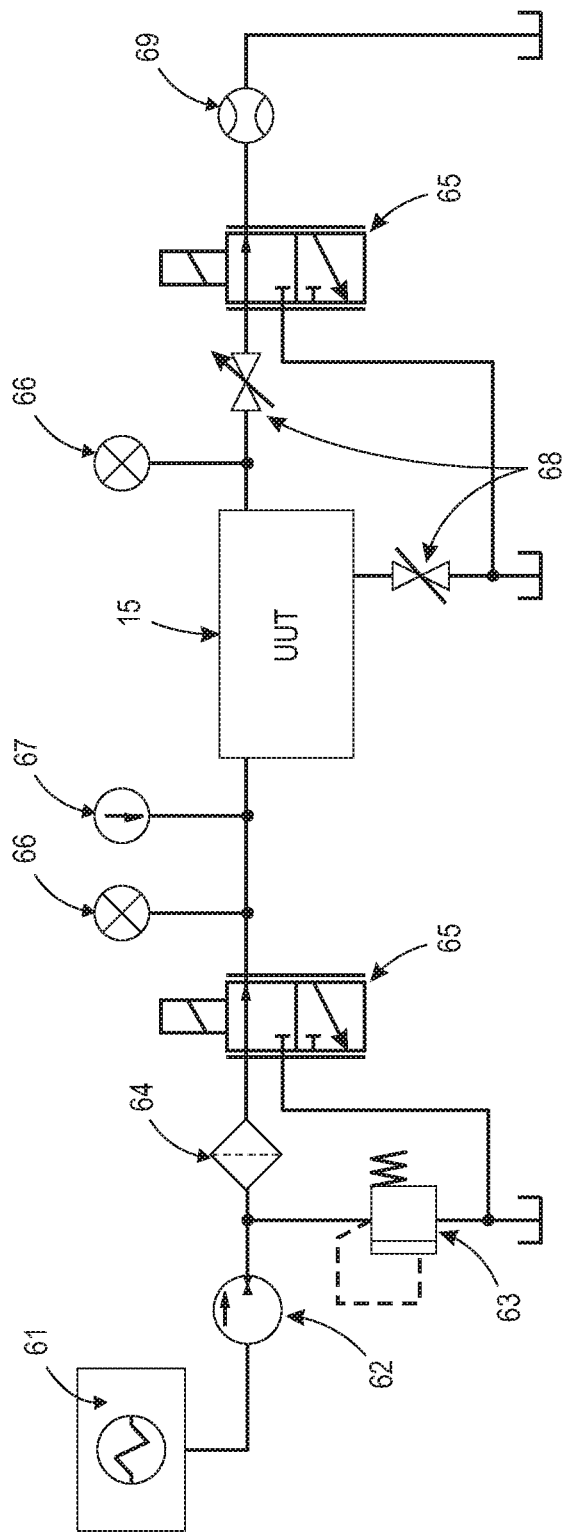
FIG. 14 is a schematic view of the calibration testing equipment.

As shown in FIG. 14, each unit is calibrated with test equipment that includes reservoir and heat exchanger 61, motor-pump 62, relief valve 63, filter 64, pressure control direct drive valves 65, pressure sensors 66, temperature sensor 67, shutoff valve 68 and flow meter 69. The calibration process is used to collect data to define the relationship between sensor outputs and delivered flow rate, while operating over a range of pressures, temperatures and spool positions. Flow-versus-pressure characteristics are precisely measured during the process. Information thus derived is used to program controller 31 so that it compensates for the particular assembly's unique set of gains, offsets, nonlinearities etc. During calibration, the test console closes a loop on delivered flow rate, based on test stand flow meter output. And during calibration, the unit under test (UUT) internal loop closure on flow rate is disabled.

```
Tfluid=[50, 92, 135];
Psupply=[200, 300, 400];
Pcontrol=[69, 46, 23];
Q=logspace(log10(.005),log10(.200),30);
for i=1:3
   T=Tfluid(i);
   for j=1:3
      Ps=Psupply(j);
      Pc=Pcontrol(j);
      for k=1:30
         Qsetpoint=Q(k);
         Read_UUT_Sensor_Outputs;
         Read_Flow_Meter_Output;
      end
   end
end
Calculate_LUT_Values;
Upload_LUT_to_UUT;
```

Valve system 15 provides a number of advantages. The valve system provides closed loop control of delivered flow rate Q, but does so without directly measuring the controlled variable. Instead, sensors 29, 26, 28 and 30 measure the fluid temperature, pressure drop and spool position, respectively. And from that information, controller 31 is able to deduce the delivered flow rate. This approach confers significant size and weight advantages, relative to alternative designs that rely on a traditional flow meter. It also provides a higher degree of mechanical robustness and vibration tolerance than can be achieved by conventional designs.

The output stage 18 of the metering valve incorporates multiple, variable orifices 24, 25, 27 that are plumbed in series. This arrangement can be tailored to ensure the pressure ratio across any single orifice will not be great enough to cause fluid cavitation. By avoiding cavitation, the relationship between orifice size, pressure drop, fluid density, and delivered flow rate becomes more predictable. This in turn enables the design to achieve a higher degree of flow rate metering accuracy than it could if the valve were allowed to transition between cavitating and non-cavitating flow regimes.

Metering accuracy is further enhanced through the use of empirically derived lookup table 45. The table values are determined for each fully assembled valve via a calibration process that exposes the valve to the full range of pressures and temperatures it will encounter in service. The values thus derived compensate for repeatable non-linearities and offsets within the assembly, which would otherwise diminish the valve's overall accuracy.

The valve incorporates a zero leakage, spool-actuated shutoff feature 40. This makes for a smaller, lighter, and more energy efficient package than can be achieved by traditional means, such as a solenoid-actuated shutoff valve. Further, as a failsafe measure, the pilot stage can be magnetically biased to force the spool to invoke and maintain shutoff mode upon the loss of electrical power.

The system may be used with liquid media. The system incorporates multiple series metering orifices for cavitation-free operation, which helps enhance its overall accuracy. The system meters fluid with a spool valve, making the integration of multiple series metering orifices readily producible. The system does not require the use of a parasitic orifice for flow rate measurement. This allows the active metering orifices and their connecting passageways to be smaller, making the valve more efficient from a size and weight standpoint.

Various additional changes and modifications may be made to the described embodiments. For example, the size, shape and configuration of the various parts are not deemed to be critical, except as may be incorporated in the claims. Nor are the materials of construction deemed to be critical. The valve spool may be slidably mounted directly in the housing, or may be slidably mounted within a bushing inserted into a through-bore provided in the housing. The depicted configuration incorporates rectangular metering slots in the bushing, which favors the minimization of metering error at maximum flow rate. Alternatively, linearly tapered, or exponentially shaped metering slots could be incorporated, which would favor the minimization of metering error across the full range of flows, assuming such error were expressed as a percentage of the commanded flow rate. An external filter could be substituted for the internal one shown. Pressure sensors having built-in temperature measurement capabilities may be employed. The use of such a device would permit the elimination of the discrete temperature sensor shown in the accompanying illustrations. If desired, the controller could be programmed to close the loop on mass flow rate, rather than volumetric flow rate. The shutoff feature could be omitted, for those applications not requiring a positive, leak-tight shutoff. If desired, the controller could be programmed to close the loop on mass flow rate, rather than volumetric flow rate. Any non-compressible fluid could potentially be used as the operating media.

Therefore, while the presently preferred form of an improved valve system has been shown and described, and several modifications thereof discussed, persons skilled in this art will readily appreciate that various additional changes and modifications may be made without departing from the scope of the invention, as defined and differentiated by the claims.

What is claimed is:

1. A flow control valve system comprising:
   a pilot stage valve;
   an hydraulic stage valve in fluid communication with said pilot stage valve;
   said hydraulic stage valve comprising a valve member movably mounted in a valve chamber along a valve axis, and adapted to be moved along said valve axis to selectively meter fluid flow in a flow path from at least one inlet port defined between said valve member and said valve chamber and at least one outlet port defined between said valve member and said valve chamber;
   said hydraulic stage valve comprising at least two variable-sized orifices defined between said valve member and said valve chamber and disposed in said flow path between said inlet port and said outlet port;
   wherein said at least two variable-sized orifices are sized such that an upstream and downstream pressure ratio does not exceed a threshold ratio of 2.0;
   an upstream pressure sensor;
   a downstream pressure sensor;
   a fluid temperature sensor;
   a position sensor configured to sense a linear position of said valve member relative to said valve chamber;
   a controller that receives input from said upstream pressure sensor, said downstream pressure sensor, said fluid temperature sensor and said position sensor; and
   said controller configured to provide a control signal to said pilot stage valve as a function of said input from said upstream pressure sensor, said downstream pressure sensor, said fluid temperature sensor and said position sensor.

2. The flow control valve system set forth in claim 1, comprising a shutoff valve disposed in said flow path upstream of said inlet port.

3. The flow control valve system set forth in claim 1, comprising a filter disposed in said flow path upstream of said inlet port.

4. The flow control valve system set forth in claim 1, wherein said position sensor is selected from a group consisting of a linear variable differential transformer (LVDT), a Hall effect device (HED), an inductive sensor, a capacitive sensor and an encoder.

5. The flow control valve system set forth in claim 1, wherein said controller determines a calculated flow rate based on said input from said upstream pressure sensor, said downstream pressure sensor, said fluid temperature sensor and said position sensor.

6. The flow control valve system set forth in claim 5, wherein said controller comprises a look-up table having values loaded in a calibration process and determines said calculated flow rate based on said look-up table.

7. The flow control valve system set forth in claim 5, wherein said controller provides said control signal to said pilot stage valve based on said calculated flow rate.

8. The flow control valve system set forth in claim 7, wherein said controller provides said control signal to said pilot stage valve in a closed loop to minimize a difference between a commanded flow rate and said calculated flow rate.

9. The flow control valve system set forth in claim 1, wherein said fluid temperature sensor is disposed in said flow path upstream of said inlet port.

10. A method of controlling the flow of a fluid comprising the steps of:
provided an hydraulic valve having a valve member movably mounted in a valve chamber along a valve axis to selectively meter fluid flow in a flow path from at least one inlet port defined between said valve member and said valve chamber and at least one outlet port defined between said valve member and said valve chamber, and at least two variable-sized orifices defined between said valve member and said valve chamber and disposed in said flow path between said inlet port and said outlet port;
controlling the size of said at least two variable-sized orifices such that an upstream and downstream pressure ratio does not exceed a threshold ratio of 2.0;
providing a upstream pressure sensor, a downstream pressure sensor, a fluid temperature sensor, and a position sensor configured to sense a linear position of said valve member relative to said valve chamber;
providing a controller that receives input from said upstream pressure sensor, said downstream pressure sensor, said fluid temperature sensor and said position sensor; and
moving said valve member in said valve chamber along said valve axis to selectively meter fluid flow in said flow path as a function of said input from said upstream pressure sensor, said downstream pressure sensor, said fluid temperature sensor and said position sensor.

11. The method set forth in claim 10, comprising the step of determining a calculated flow rate based on said input from said upstream pressure sensor, said downstream pressure sensor, said fluid temperature sensor and said position sensor.

12. The method set forth in claim 11, comprising the step of exposing said hydraulic valve to a range of pressures and temperatures in a calibration process and determining said calculated flow rate based on at least one value from said calibration process accessed by said controller.

13. The method set forth in claim 12, wherein said value is recorded in a look-up table accessed by said controller.

14. The method set forth in claim 11, comprising the step of providing a control signal to said hydraulic valve in a closed loop to minimize a difference between a commanded flow rate and said calculated flow rate.

15. The method set forth in claim 14, wherein said hydraulic valve comprises a pilot stage valve in fluid communication with an hydraulic stage valve and said step of providing a control signal to said hydraulic valve in a closed loop to minimize a difference between a commanded flow rate and said calculated flow rate comprises the step of providing said control signal to said pilot stage valve.

* * * * *